US005474139A

United States Patent [19]

Odendahl et al.

[11] Patent Number: 5,474,139

[45] Date of Patent: Dec. 12, 1995

[54] DEVICE FOR POWER TOOLS

[75] Inventors: Alfred Odendahl, Waldenbuch; Karl Wanner, Leinfelden-Echterdingen, both of Germany

[73] Assignee: Robert Bosch GmbH, Stuttgart, Germany

[21] Appl. No.: 211,328

[22] PCT Filed: Sep. 24, 1992

[86] PCT No.: PCT/DE92/00820

§ 371 Date: Mar. 25, 1994

§ 102(e) Date: Mar. 25, 1994

[87] PCT Pub. No.: WO93/05929

PCT Pub. Date: Apr. 1, 1993

[30] Foreign Application Priority Data

Sep. 26, 1991 [DE] Germany .......................... 41 32 023.9

[51] Int. Cl.[6] .......................... B23B 31/02; B25D 17/08

[52] U.S. Cl. .......................................... 173/104; 279/19.3

[58] Field of Search .................................... 173/104, 109; 279/19.3, 19.5, 89; 408/226

[56] References Cited

U.S. PATENT DOCUMENTS 5,076,371 12/1991 Obermeier et al. ..................... 173/104
5,324,145 6/1994 Kleine .................................. 279/19.3
5,346,340 9/1994 Runge .................................. 279/19.3

FOREIGN PATENT DOCUMENTS 8510262 8/1985 Germany .
3506008 8/1986 Germany .
3205063 10/1986 Germany .

*Primary Examiner*—Scott A. Smith
*Attorney, Agent, or Firm*—Michael J. Striker

[57] ABSTRACT

A device on machine tools for transmitting a rotational and/or percussive movement to a tool (22) has two or three rotational drivers (14) which are arranged so as to be symmetrical with respect to rotation. The rotational drivers (14) are stepped and flank parts (16) extending radially to the center axis (15) alternate with guide portions (17) extending along a cylindrical outer surface. Locking members (20) which engage in depressions (28) at the tool (22) are arranged in the region of the rotational drivers (14) for the axial locking of the tools (10). With the tool holder (10) according to the invention, tool shafts having diameters between 8 and 12 mm can be clamped without converting or modifying the tool shafts. Good true running characteristics can be achieved in spite of the stationary rotational drivers (14).

10 Claims, 5 Drawing Sheets

DEVICE FOR POWER TOOLS

BACKGROUND OF THE INVENTION

The present invention relates to a device on hand-held machine tools.

A tool holder which is constructed as a drill chuck and whose rotational driving elements are formed by a plurality of gripping segments lying one on top of another is known from DE-U 85 10 262. The gripping segments have an approximately trapezoidal or circular cross-sectional shape, are curved in profile, and merge with one another in curved portions. The lateral surfaces of the rotational drivers are accordingly not planar and are arranged relative to the direction of the application of force in a disadvantageous manner for the transmission of torque.

SUMMARY OF THE INVENTION

Accordingly, it is an object of the present invention to provide a device for power tools, which avoids the disadvantages of the prior art.

In keeping with these objects and with others which will become apparent hereinafter, one feature of the present invention resides, briefly stated, in a tool holder in a hand-held machine tool for transmitting a rotational movement and/or a percussive movement to a tool having a plurality of grooves for rotational driving which grooves are partially open toward an end of a tool shaft, which tool holder has a tool holder body with a receptacle hole provided with a plurality of inwardly projecting rotational drivers, wherein in accordance with the present invention the rotational drivers have stepped flanks and are engageable in the grooves of the tool, the rotational drivers are arranged so as to be stationary in the receptacle hole, the flanks of the rotational drivers extend approximately radially in a plane and are connected by guide portions formed by portions of a cylindrical outer surface extending in a circumferential direction around the receptacle hole.

The device in accordance with the present invention; has the advantage over the prior art that the rotational drivers are aligned in an optimal manner with respect to the requirements for an effective transmission of torque and also offer the best possible guidance and centering of the drilling tool. The device has the additional advantage that the weakening of the tool shaft caused by the rotational drivers is kept at a minimum in spite of the possibility of clamping tool shafts of various diameters. In a particularly advantageous manner, the rotational drivers have guide portions located at a distance of 4 mm, 5 mm or approximately 6 mm from the center axis of the receptacle hole. Accordingly, tools with shafts of 8 mm, 10 mm or 12 mm can be optimally guided, which ensures excellent true running. The arrangement of locking members in the region of the rotational drivers is also particularly advantageous. This also serves to keep the weakening of the tool shaft within narrow limits. Resiliently supported locking members automatically recede or yield when a tool is inserted and engage in its wake in axial locking grooves of the tool. This adds to the convenience of operation. As the axial locking members engage in the receptacle hole to various depths depending on the shaft diameter of the inserted tool, this may be used advantageously for sensing the diameter of the drilling tool and adjusting the speed accordingly. It is particularly advantageous that this sensing is effected in a purely mechanical manner and the information obtained thereby is also mechanically transmitted via a sleeve so that the sensing device is impervious to soiling and also remains functional under the harsh operating conditions of the construction site.

The present invention also deals with a tool for a drill chuck or a tool holder of a hand-held drill or hammer device, having a shaft with an insertion and provided with a plurality of grooves which are open toward the insertion end and arranged at angular intervals at a circumference of the shaft, wherein in accordance with the present invention the grooves have planar lateral walls which are arranged approximately radially to a tool axis and connected by radial portions in the shape of a cylindrical outer surface.

The tools designed in accordance with the present invention; have the special advantage that a standardized shaft is not required. Rather, thinner and thicker tool shafts can be inserted into the same tool receptacle depending on the diameter of the tool head. This is achieved by means of stepped rotational driving slots or grooves. The greater the difference in diameter between tools, the more steps must be provided.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
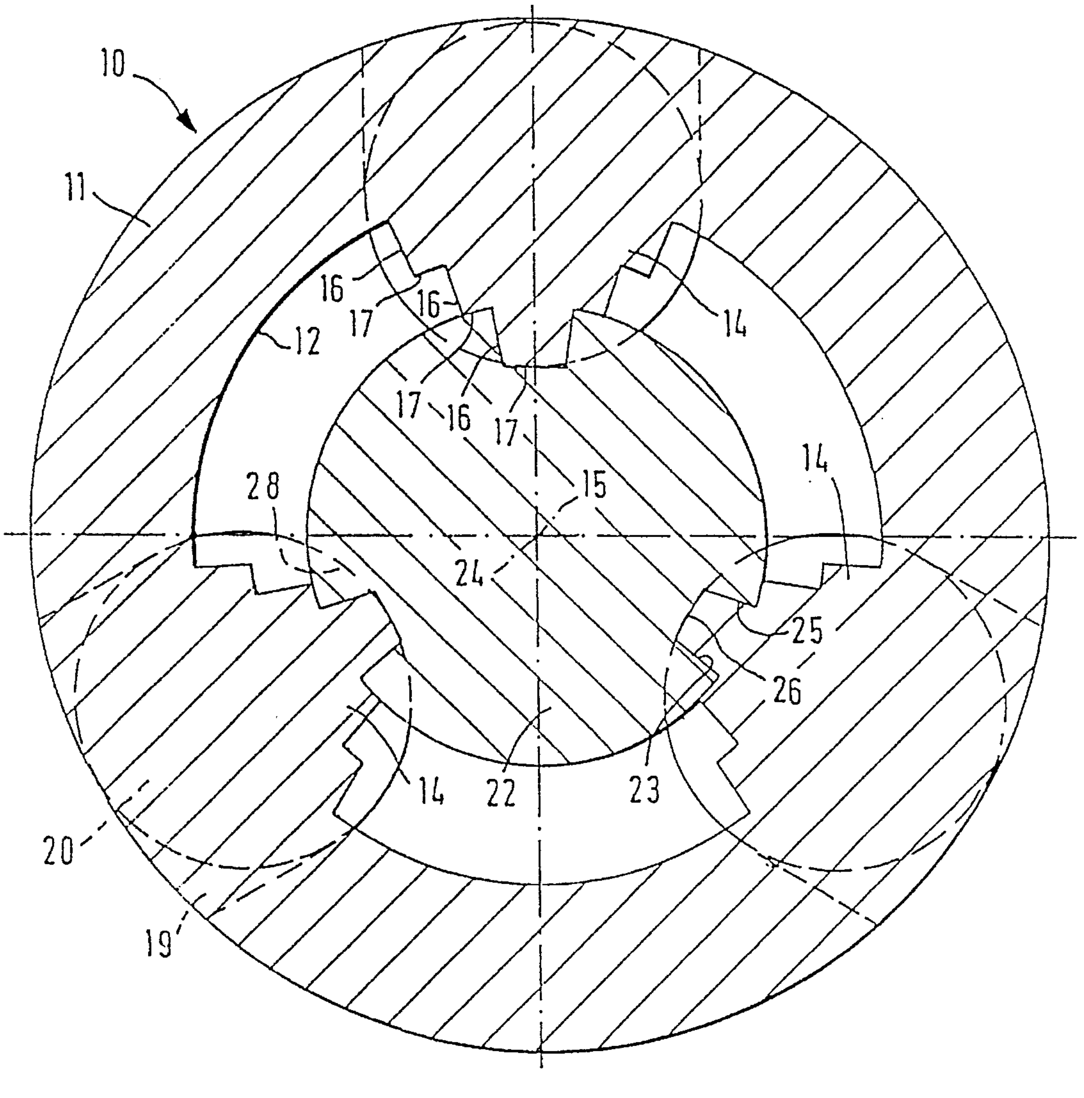
FIG. 1 shows a device on hand-held machine tools in cross section with an inserted tool shaft of small diameter.

The device according to the invention substantially has a tool holder 10 and a tool 22 held therein. A base body 11 of the tool holder 10 with a receptacle hole 12 is shown in section. In the first embodiment example, three identically constructed, stationary rotational drivers 14 project into the receptacle hole 12. The rotational drivers 14 have a stepped construction, and planar flank parts 16 extending radially with reference to the center axis 15 of the tool holder 10 alternate with guide portions 17 constructed with a cylinder-shaped outer surface in the circumferential direction. The receptacle hole 12 itself also acts as a guide portion. The rotational drivers 14 are stepped in such a way that the guide portions 17 are situated on a cylindrical outer surface having a diameter of 6 mm, 8 mm and 10 mm coaxially to the center axis 15. The receptacle hole 12 has a diameter of 12 mm.

The rotational drivers 14 extend a certain distance along the receptacle hole 12. Roughly in the center of this distance, the rotational drivers 14 are penetrated by an opening 19 which also penetrates the base body 11. Locking members 20 are inserted into the openings 19 and project somewhat beyond the projected area of the rotational drivers 14. The locking members 20 are advantageously constructed as balls, rollers or stepped locking bodies according to DE 35 06 008 A1 (=GB 21 71 340), whose contents are incorporated in this application.

A tool 22 is clamped in the tool holder 10. The tool 22 has grooves 23 which open out toward its shaft end and extend along the shaft for rotational driving. In the tool shown in FIG. 1, the latter are simple grooves without steps and with planar lateral walls 25 arranged radially to the tool axis 24 and a roughly planar base surface 26 connecting the lateral walls 25. In the region of the locking members 20, the tool 22 has three depressions 28 forming an extension of the grooves 23. The depressions 28 are advantageously elongated in the axial direction of the tool 22 and are longer than the locking members 20 by an amount corresponding to the idle path of the tool.

Figure 5:
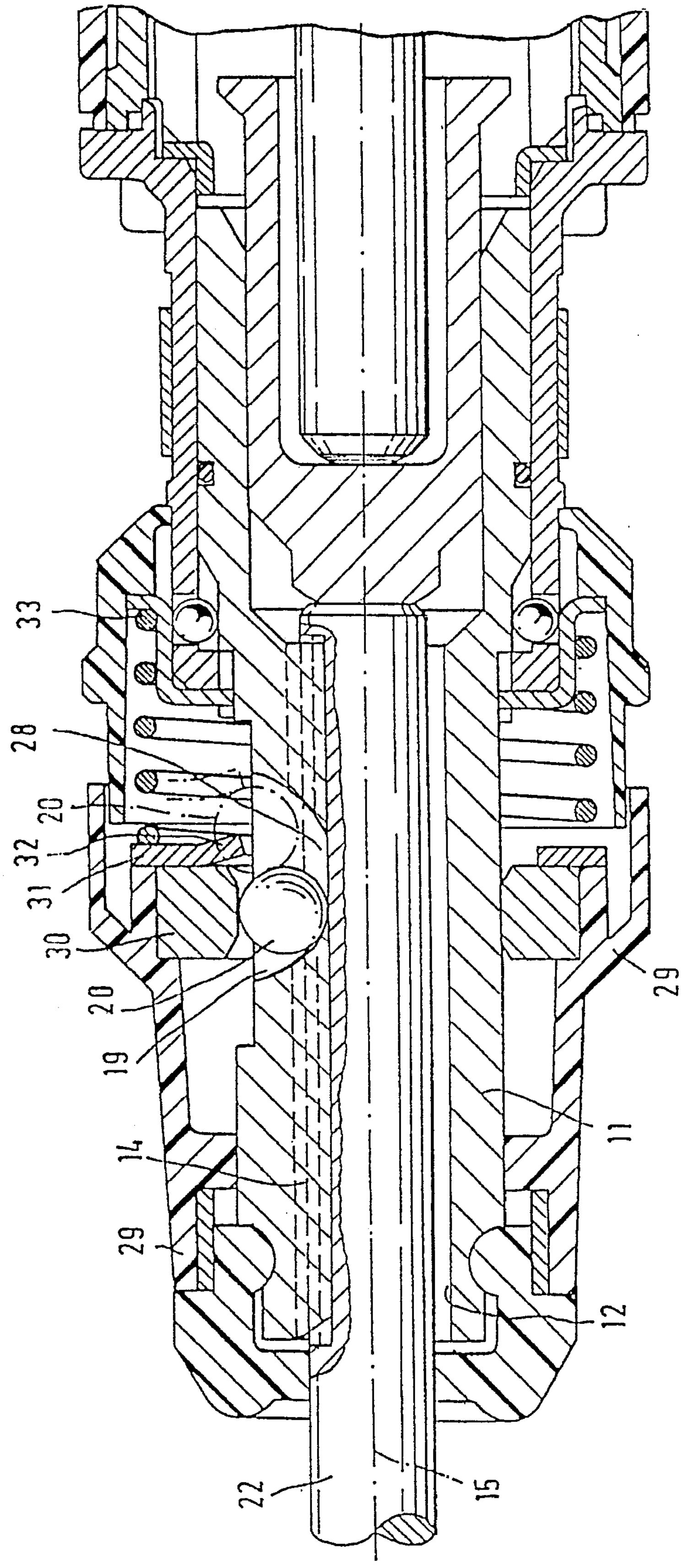
FIG. 5 shows a longitudinal section through a tool holder according to FIG. 2.

The tool holder 10 has a sliding sleeve 29 which surrounds the base body 11 and the locking members 20 and is longitudinally displaceable within limits (see also FIG. 5). It contains a thickened portion or a retaining ring 30 which secures the locking members 20 in the depressions 28. A plate ring 31 having elongations 32 in the region of the locking members 20 contacts the retaining ring 30 laterally. The plate ring 31 is pressed against the sliding sleeve 29 and the retaining ring 30 by a pressure spring 33.

As is shown in FIG. 5 in dashed lines, the locking members 20 are deflected radially against the force of the pressure spring 33 when a tool is inserted into the receptacle hole 17. When the tool shaft is fully inserted, the locking members 20 are forced back again by the pressure spring 33 into their initial positions so as to lock. In other respects, the design and operation correspond to the description in DE 32 05 063 C2 (GB 20 96 045 B2) whose contents are incorporated herein by reference.

The retaining ring 30 and plate ring 31 can be adapted to the locking members 20 in such a way that the position of the plate ring 31 indicates the penetration depth of the locking members 20 and accordingly the shaft diameter of the inserted tool. The position of the plate ring 31 or the position of a corresponding sleeve can then be referred to for the purpose of adjusting the speed of the drive motor. In this case, in contrast to the FIGS. 1 to 4, the depressions 28 would have to be constructed with different depths depending on the diameter of the shaft.

Figure 2:
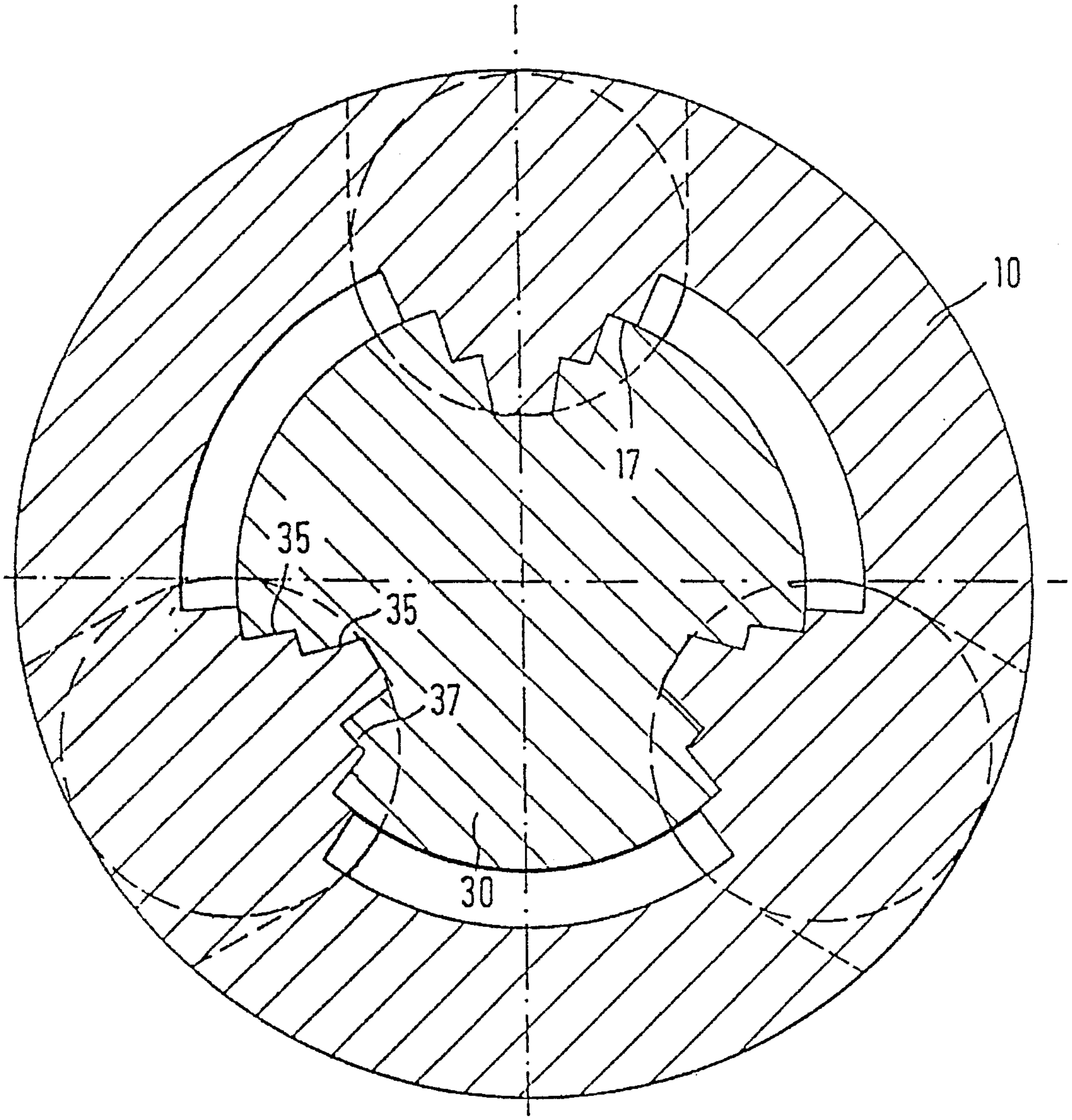
FIGS. 2 and 3 show the same device with inserted tools of different sizes.

The tool holder 10 shown in FIG. 2 is identical to that shown in FIG. 1, with the exception that a tool shaft 30 with a large diameter is now inserted. The tool 30 likewise has longitudinally extending grooves 33 which are formed by two pairs of lateral walls 35 which are offset in the circumferential direction. The grooves 33 are thus stepped and radial portions 37 are formed between the lateral walls 35. The radial portions 37 are adapted to the guide portions 17 of the tool holder 10 and extend along a cylindrical outer surface.

Figure 3:
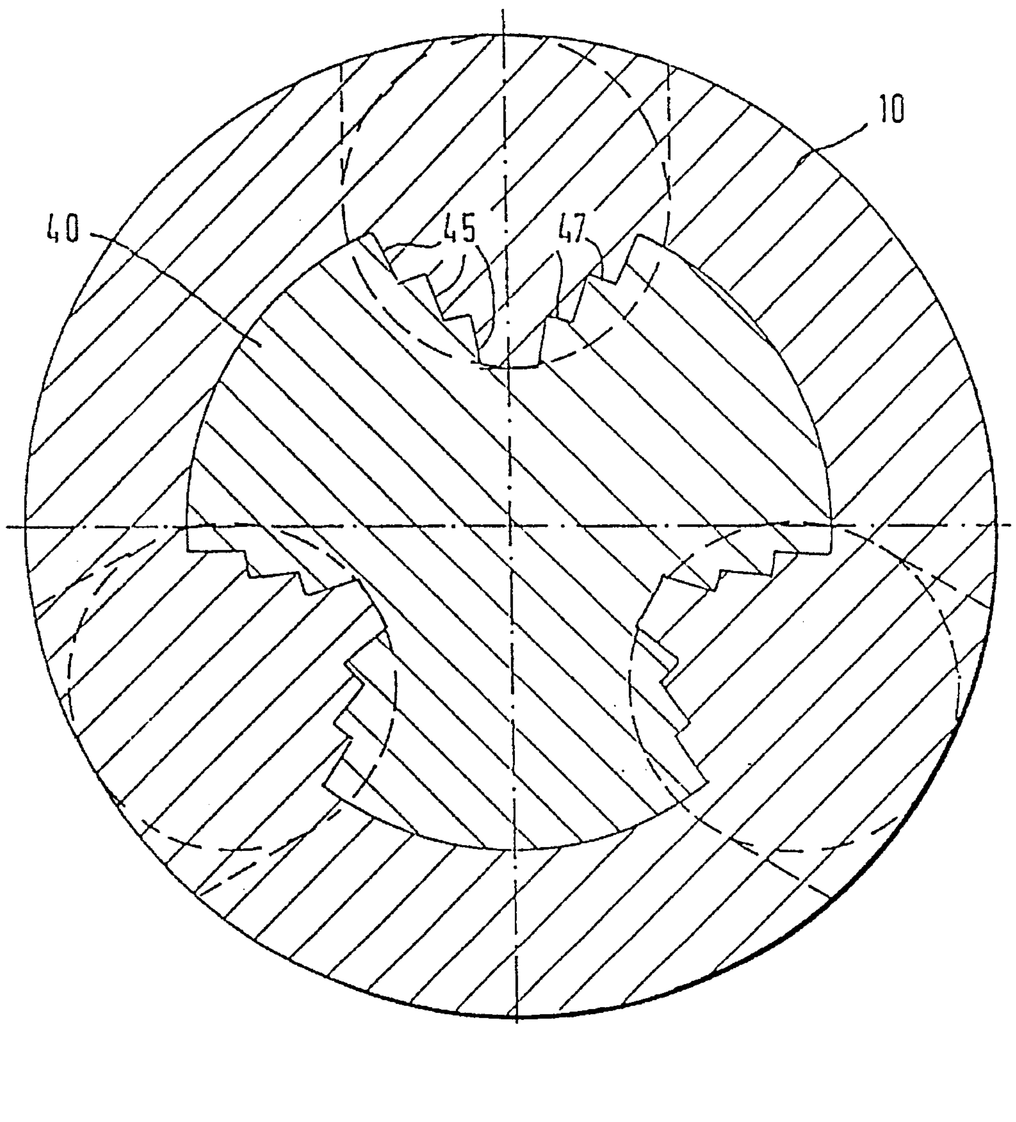

In FIG. 3, a third tool 40 is shown in the tool holder 10 which is identical to that shown in the previous Figure. The shaft of the tool 40 has a diameter of 12 mm and contacts the receptacle hole 12. The grooves 43 have three steps instead of two steps as in the preceding figure. Three pairs of lateral walls 45 alternate with radial portions 47. In other respects, the tool 40 corresponds to the tools 22 and 30 shown above.

Figure 4:
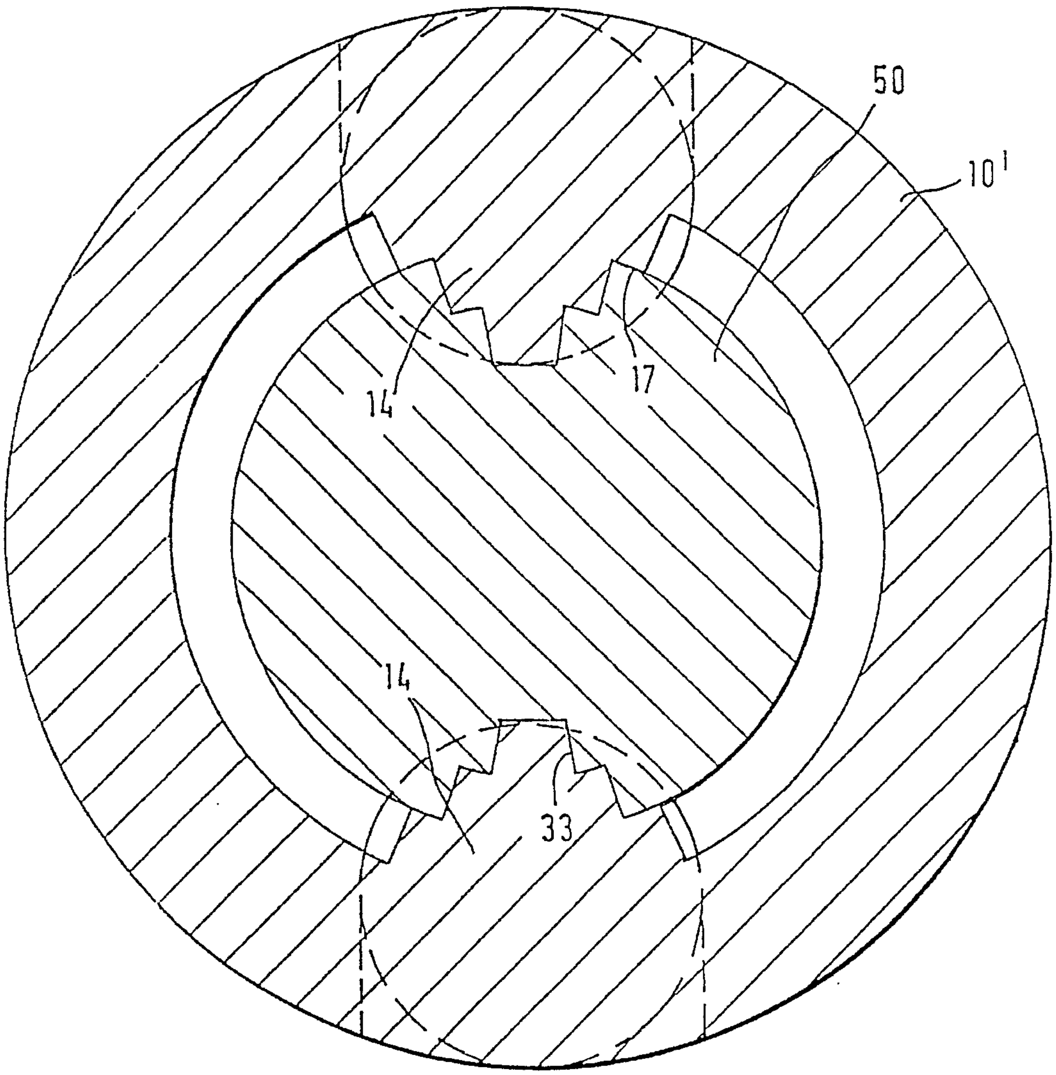
FIG. 4 shows a device with two rotational drivers in another embodiment example.

The second embodiment example according to FIG. 4 is distinguished from the first embodiment example only in that two rotational drivers 14 are constructed at the tool receptacle 10' and only two grooves 33 are constructed at the tool 50. It has the particular advantage that tools with two or four grooves at the shaft can also be clamped.

To insert a tool 22 into the tool holder 10, the rotational drivers 14 are aligned with the grooves 23 and the tool 22 is slid into the receptacle hole 12. When the end of the tool shaft reaches the locking members 20, the latter are deflected outward, preferably radially, and catch in the depressions 28 again as the tool is slid forward. The tool 23 may not readily be pulled out, since the locking members 20 are prevented, e.g. by a sleeve, from deflecting in this direction. To remove a tool, this sleeve must first be actuated by the user. The tool 22 is centered and guided by the guide portions 17 at the rotational drivers 14. This results in good true running or concentric running characteristics in spite of the stationary rotational drivers 14. To facilitate insertion of a tool, the rotational drivers can either be beveled at their front edge or the grooves 23 can be beveled at the end of the shaft. In the tool with a shaft of 10 mm, according to FIGS. 2 and 4, the centering and guidance is improved by additional guide portions 17.

Because of the stepped construction of the rotational drivers 14, the device, according to the invention, for transmitting a rotating and/or percussive movement to a tool is suitable for various shaft diameters without requiring any modification of the tool holder 10. Drilling tools with drill diameters between 4 mm and 8 mm receive a shaft diameter of 8 mm and are inserted into the tool holder 10 according to FIG. 1. Tools with drill diameters between 8 mm and 12 mm receive a 10-mm shaft according to FIG. 2. Tools with drill diameters greater than 12 mm are outfitted with a shaft diameter of 12 mm and fit into the tool holder 10 according to the invention with reference to FIG. 3.

The device according to the invention can also be used for mechanically sensing the size of the inserted tool. The depth of the depressions 28 are constructed differently with reference to the receptacle hole 17 depending on the drill head diameter. Consequently, the locking members 20 engage at different depths. The end position of the locking members 20 determines the position of a sensing sleeve within the tool receptacle as is described in DE 35 06 008 A1 (GB 21 71 340 B) whose disclosure is incorporated herein by reference. Depending on the position of the sensing sleeve, the speed of the drill is correctly adjusted corresponding to the drill diameter.

We claim:

1. A tool holder in a hand-held machine tool, in particular a hand-held drill or a hammer device, for transmitting at least one of a rotational movement and a percussive movement to a tool having a plurality of grooves for rotational driving which grooves are partially opened toward an end of a tool shaft, the tool holder having a tool holder body with a receptacle hole provided with a plurality of inwardly projecting rotational drivers, said rotational drivers having stepped flanks and being engageable in the grooves of the tool, said rotational drivers being arranged so as to be stationary in said receptacle hole, said flanks of said rotational drivers extending approximately radially in a plane and being connected by guide portions formed by portions of a cylindrical outer surface extending in a circumferential direction around said receptacle hole.

2. A tool holder as defined in claim 1, wherein each of said flanks of said rotational drivers has three steps.

3. A tool holder as defined in claim 1, wherein said receptacle hole has a center axis, said guide portions of said rotational drivers being spaced from said center axis at distances substantially corresponding to 4 mm, 5 mm and 6 mm.

4. A tool holder as defined in claim 1; and further comprising a plurality of locking members arranged in the region of an axial extension of said rotational drivers, said locking members having a locking position in which said locking members project somewhat beyond a projected area of said rotational drivers as seen in an axial direction of said receptacle hole.

5. A tool holder as defined in claim 4, wherein said tool holder body has an open end, said locking members being resiliently supported relative to an action from said open end of said tool holder body.

6. A tool holder as defined in claim 4, wherein said locking members engage at different depth in said receptacle hole in said locking position, depending on a shaft diameter of the inserted tool.

7. A tool holder as defined in claim 4; and further comprising a sensing member which senses a position of said locking members for adjusting a speed of a drive motor of the hand-held machine tool.

8. A tool holder as defined in claim 7, wherein said sensing member is formed as a sleeve.

9. A tool holder as defined in claim 7, wherein said sensing member is formed as a plate ring.

10. A hand-held machine tool, comprising a tool having a shaft with an insertion end and a plurality of grooves opening toward said insertion end and arranged at angular intervals at a circumference of said shaft, said grooves having planar lateral walls which are arranged approximately radially to a tool axis and connected by radial portions in the shape of a cylindrical outer surface; and a tool holder having a receptacle hole with inwardly projecting rotational drivers which have stepped flanks and engage in said grooves of said tool, said rotational drivers being arranged so as to be stationary in said receptacle hole, said flanks of said rotational drivers extending approximately radially in a plane and being connected by guide portions which are formed by strip portions of a cylindrical outer surface which extends in a circumferential direction around said receptacle hole.

* * * * *